Sept. 5, 1939.  H. B. HOLMES ET AL  2,171,560
METHOD OF AND APPARATUS FOR FISHWAY COLLECTING SYSTEMS
Filed March 1, 1938  2 Sheets-Sheet 1

Inventors
Harlan B. Holmes
Henry F. Blood
Milo C. Bell
By Adam Richmond
Attorney Sept. 5, 1939.   H. B. HOLMES ET AL   2,171,560
METHOD OF AND APPARATUS FOR FISHWAY COLLECTING SYSTEMS
Filed March 1, 1938   2 Sheets-Sheet 2

Inventors
Harlan B. Holmes
Henry F. Blood
Milo C. Bell
By Adam Richmond
Attorney Patented Sept. 5, 1939

2,171,560

UNITED STATES PATENT OFFICE 2,171,560

METHOD OF AND APPARATUS FOR FISHWAY COLLECTING SYSTEMS

Harlan B. Holmes and Henry F. Blood, Portland, Oreg., and Milo C. Bell, Seattle, Wash., assignors to the Government of the United States of America, as represented by the Secreary of War Application March 1, 1938, Serial No. 193,293

11 Claims. (Cl. 61—21)

(Granted under the act of March 3, 1883, as amended April 30, 1928; 370 O. G. 757)

This invention described herein may be manufactured and used by or for the Government for governmental purposes, without the payment to us of any royalty thereon.

This invention relates to improved methods and structures for effecting the attraction of migratory fish into fishways disposed about dams.

In the development of the art pertaining to fishways for migratory fish, attention heretofore has been directed almost exclusively to the provision of devices by means of which fish may be carried or permitted to progress from one water level to another without excessive exertion on their part. Very little attention has been given to the problem of making the entries to fishways readily apparent to the fish. It has been generally assumed that the quantity of water allowable to a fishway must be comparatively small. It naturally has followed that the entrance to the fishway also must be correspondingly small. As a result of this trend of development, the greatest single cause of inefficiency and failure in fishways is the inability of the fish readily to discover the entrance thereto, rather than their inability or reluctance to negotiate the passages provided.

The fact that fish eventually find the entrance to a fishway does not in itself justify the conclusion that the device is efficient. Fish frequently are seriously injured in their vain efforts to surmount the obstruction before finally finding the entrance to a fishway. In the case of salmon, which do not feed while making their upstream migration to the spawning grounds, a prolonged delay at a dam while seeking a way to pass, may cause an excessive expenditure of their limited supply of energy, stored in the form of fat, with the result that the fish may be unable to complete their migration and perform the rigorous act of spawning.

Fish such as salmon and trout, which are strong swimmers, have a preference for comparatively fast flowing water, and are inclined upon encountering a dam to seek a passage by way of the discharge through the spillways and power wheels, rather than to search for a route leading from the adjacent areas of comparatively quiet water. Fishways, therefore, must compete with these points of discharge in attracting the fish. Due however to limitations imposed by cost, structural design, space, and water economy, the size of a fishway usually is limited. The quantities of water that can be carried by these ordinarily limited structures, and the areas over which this water can be distributed at the entrances, are so slight that the attraction commonly furnished by the fishways is insignificant when compared with the counter attractions represented by the spillway and power wheel discharges. This results in fishways of low efficiency.

The effectiveness of a fishway entrance depends to a great extent upon its location with respect to the dam and the counter attractions. For example, it is desirable in general to place the fishway entrances adjacent the spillway or draft tube openings, where advantage may be taken of the concentration of fish induced by these counter attractions. The exact positions of these favorable locations usually change with variations in powerhouse operation, spillway regulation, and river stages. Conventional fishway practice rarely permits flexibility in the nature and position of fishway entrances to correspond with these differing conditions.

With these conditions in mind, the primary object of the invention is to improve the effectiveness of a fishway by increasing the size of the entrance and causing to flow therefrom an auxiliary supply of moving water much greater in quantity than can be passed reasonably through the fishway proper, this auxiliary water being introduced into the entrance in such a manner that it in itself does not constitute a counter attraction, but leads the fish in the direction to be followed in entering and traversing the fishway.

Another object is to provide means for maintaining the effectiveness of a fishway entrance over the range of variations in river flow and the accompanying fluctuations in tailrace elevation.

Another object is to provide means for controlling the quantity and velocity of water emerging from a fishway, so as to provide conditions most attractive to the fish.

Another object is to improve the effectiveness of a fishway by providing multiple entrances variable in nature and position with respect to the dam and to variations in the flow of water thereabout.

We have selected the term "collecting system" for use in referring to a structure that embodies the essential features of our invention.

In general a collecting system consists of a water passage extending beyond the normal downstream terminus of a fishway and terminated by an expanded entrance or by multiple entrances. In this passage the normal flow of water from the fishway is augmented by an auxiliary supply of water that is added, usually through the floor or side walls, in such manner that it in itself does not constitute a counter attraction to the fish but unites with the normal flow to produce in the passage a longitudinal flow that in emerging therefrom attracts the fish to the fishway. The shape, size, and extent of the passage, the number, position and nature of the entrances, also the means of adding the auxiliary water, must be variously modified in accordance with conditions of specific installations. A collecting system may be produced either by modifying the downstream end of a conventional fishway or by adding thereto a structure in which the essential features of our invention are incorporated. The structure used to illustrate our invention is that of a composite system which illustrates various modifications and their adaptation to the specific requirements of a spillway dam on a river subject to extensive fluctuation in flow and the accompanying variation in tailrace level.

Referring more particularly to the accompanying drawings in which corresponding parts are indicated by similar reference characters:

In all of these figures irrelevant matter has been omitted to more clearly disclose the invention.

Figure 3:
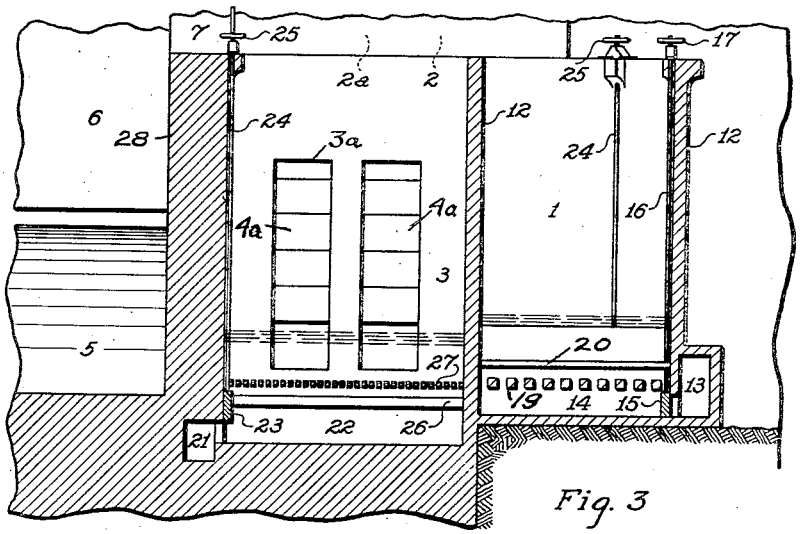
Fig. 3 is a sectional elevation taken substantially along the line 3—3 of Fig. 1 and in the direction indicated.
Figure 4:
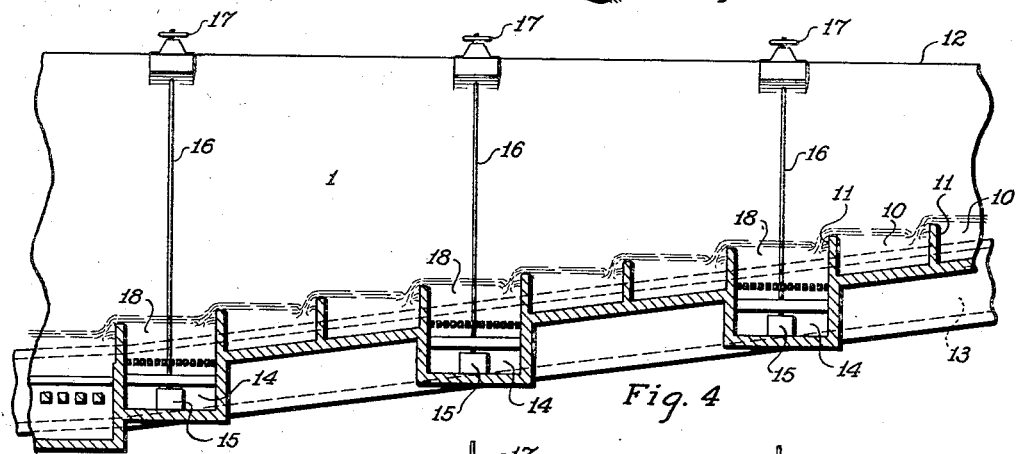
Fig. 4 is a sectional elevation taken through the downstream end of a fish ladder and substantially along the line 4—4 of Fig. 1 and in the direction indicated. This figure shows the hydraulic conditions existing therein at a low stage of the tailrace.
Figure 6:
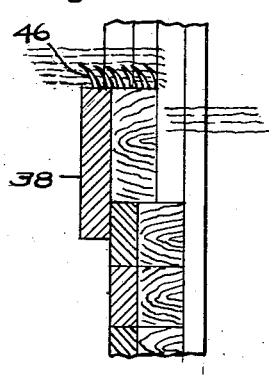
Fig. 6 is an enlarged detail partly in section and partly in elevation of the upper portion of one of the regulating gates and illustrates the arrangement of the fish trap on the upper edge of said gate.

The embodiment of the invention as illustrated is a composite structure comprising a modified lower end of a conventional fishladder 1, a pair of fish locks 2 and 2a having entrance portals (3a) within which are adjustably mounted segmental gate units (4a) (Fig. 3), an entrance bay 3, and a removable collection passage 4 extending across spillway gate bays 5 and 5a of a dam structure 7, having a forebay 8 and a tailrace 9. The flow of water from the forebay 8 through spillway gate bays 5 and 5a is regulated as by gates 6 and 6a.

The ladder 1 is of conventional design in that it consists of a series of pools 10 separated from each other by weirs 11. The design is modified to the extent that the tops of side walls 12 are above the maximum elevation of tailrace 9. There also is added an auxiliary water system by which extra water may be supplied to the ladder at intervals along its lower course. This auxiliary water system comprises a closed conduit 13 by which water may be carried from any suitable source as from the forebay 8 to a series of spaced diffusion chambers 14, each of which is in controlled communication with the conduit 13. The flow of water into the diffusion chambers is suitable controlled as by valves 15, which may be actuated by stems 16 and hand wheels 17.

Each of the diffusion chambers 14 is disposed below a pool 10 with which it is in open communication via suitable diffusion means as primary diffusion grill 19 and secondary diffusion grill 20. The diffusion grills 19 and 20 are preferably spaced apart, and cause any auxiliary water received by the diffusion chamber 14 to be introduced into the normal flow, through the fish ladder 1, at a relatively uniform velocity over the area of the secondary diffusion grill 20.

Entrance bay 3 also is provided with means whereby auxiliary water may be added. Conduit 13 is provided with an extension 21 to serve the entrance bay 3. Diffusing chambers 22, each of which is in controlled communication with the extension 21, are disposed below entrance bay 3. The flow of auxiliary water to the diffusion chambers 22 may be suitably controlled as by valves 23, which may be actuated by stems 24 and handwheels 25. Suitable diffusion of the auxiliary water flowing from these latter diffusion chambers is effected as by the use of grills 26 and 27.

The collection channel 4 is normally in open communication at one of its ends with the entrance bay 3 and extends therefrom obliquely toward the axis of the dam 7 traversing those piers 28, 28a, 28b located within its limits. The upstream wall of the collection channel is formed of vertical apertured walls 29 removably mounted as in grooves 30 disposed in the piers 28, 28a and 28b. The apertured partitions 29 permit passage therethrough of the water released by spillway gates 6 and 6a, but prevent the passage upstream therethrough of migrating fish. The downstream wall of the collection channel is a removable structure. It comprises a plurality of needle beams 31 suitably fitted at their lower ends as in transverse members 32 which in turn are removably disposed in grooves 33 formed in the downstream ends of the piers 28, 28a and 28b. The upper ends of the needle beams 31 are secured as to a bridge 34 as shown fragmentarily in Fig. 2. The needle beams 31 are provided with means forming two sets of stop log guides, downstream guides 35 and upstream guides 36. The downstream guides are adapted to receive stoplogs 37, and the upstream guides to receive regulating gates 38.

The effective height of the downstream wall can be roughly adjusted by varying the number of stop logs 37 disposed in the guides 35, and close adjustment can be had by manipulation of the regulating gates 38 disposed in guides 36.

Figure 1:
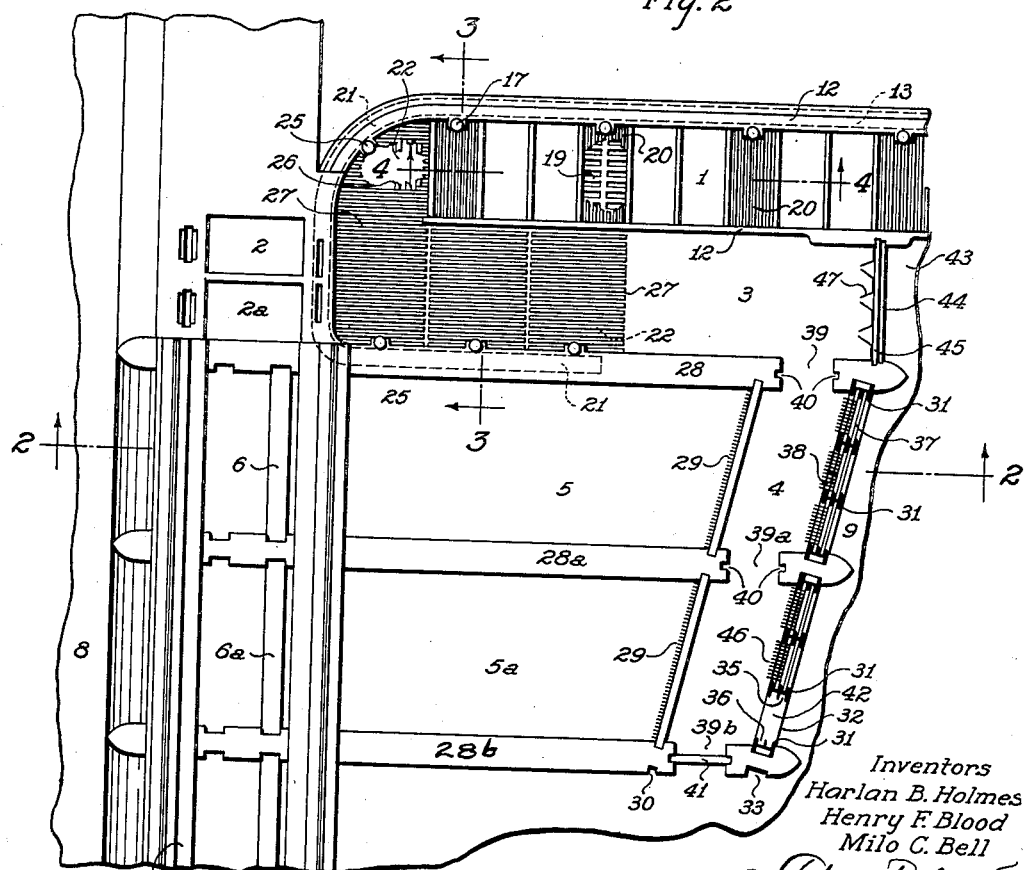
Figure 1 is a fragmentary plan view of a spillway dam embodying our invention in a composite collecting system.

The length of the collection channel 4 may be designed to include as many bays as may be needed. In use it may be shortened, to meet changing flow conditions, by removing the upstream and downstream wall sections between piers as required. As shown in Fig. 1, two bays 5 and 5a are traversed by this structure.

Apertures in each of the piers traversed by the collection channel 4, as piers 28, 28a and 28b, are provided as apertures 39, 39a and 39b whereby open communication may be established with the entrance bay 3. Each of these apertures is provided with guides 40 in which stop logs 41 may be placed to close or partially close the apertures as desired.

Auxiliary water is provided for the collection channel 4 by manipulation of the spillway gates 6 and 6a, etc., permitting a sufficient flow through the spillway bays 5, 5a, etc., to provide percolation through the apertured wall 29 into the collection channel 4, from which it flows to the tailrace 9 as over regulating gates 38.

It may be desirable under some conditions to form a portal 42 near the downstream end of the collection bay 4, as by the removal of some or all of the stop logs 37 and regulating gate 38 from between two adjacent needle beams 31.

Upstream migrants can enter the collection bay 4 through the portal 42, or over the regulating gates 38. From the collection bay 4 access is had to the entrance bay 3 through the aperture 39. Access to the entrance bay 3 may also be had via an entry 43, disposed in the fixed portion of the structure, and which is provided with stop logs 44 and regulating gate 45.

Figure 2:
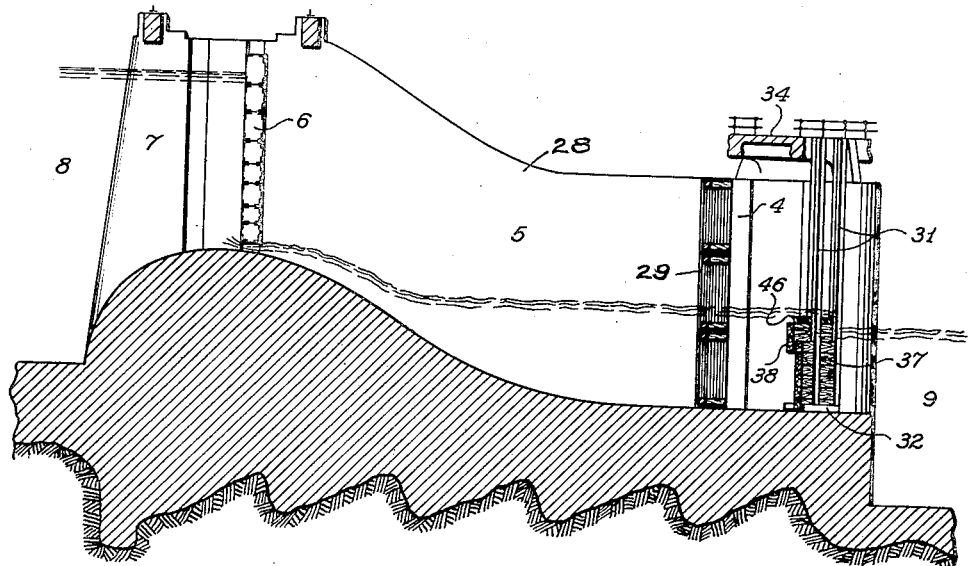
Fig. 2 is a sectional elevation taken substantially along the line 2—2 of Fig. 1 and in the direction indicated.

Suitable trapping means may be provided to prevent fish from returning to the tailrace after once entering the collecting system. The type of trap illustrated in connection with the removable collection channel 4 comprises a series of curved prongs 46 surmounting the regulating gates 38 as shown in Figs. 1 and 2 of the drawings. This type is especially effective in the comparatively shallow flows passing over such gates. Tunnel traps 47, shown attached to entry regulating gate 45 at entry 43 are better adapted to deeper flows.

The fish locks 2 and 2a are included in the illustrated embodiment of the invention merely as an example of a second fishway to which fish may be delivered after having been attracted into the collecting system. Any type of fishway with similarly placed entrances might be substituted. The fish locks may be of any conventional design. It is preferred, however, that they be installed in pairs in order that alternate ones of the pair can be so opened for the entrance of fish that a continuous flow of water to the entrance bay may be maintained therethrough.

Operation of the collecting system as illustrated can be understood most readily by first assuming conditions of maximum river flow, when all of the spillway gates 6, 6a, etc., would be required to pass the water and it would be necessary to remove all units of the removable collection channel 4, leaving only the fishway entrance 43 in the fixed structure. Under such conditions the stop logs 44, regulating gate 45, and traps 47 in this entrance would be removed so as to leave an unobstructed channel for the passage of a large volume of water. The aperture 39 through the pier 28 would be completely closed as by suitable stops logs 41. The lower pools of the fish ladder would be submerged by the high tailrace level, as is clearly shown in Fig. 5.

Figure 5:
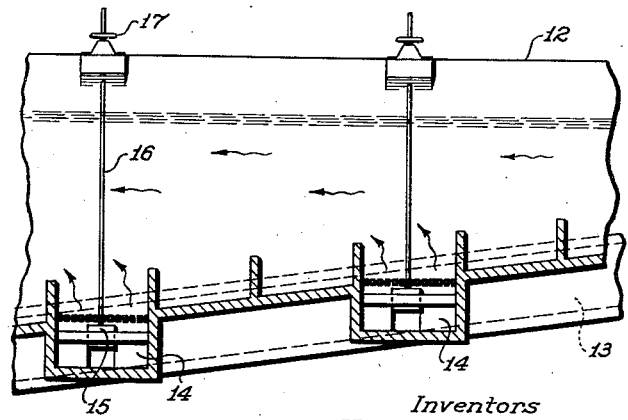
Fig. 5 is a view of the structure disclosed in Fig. 4, and shows the hydraulic conditions existing at a high stage of the tailrace.

In general, the limited flow of water descending the ladder would not be sufficient to maintain an attractive velocity over this submerged part of the ladder. This condition is corrected by adding auxiliary water through the diffusion chambers 14 under the submerged portion of the ladder, as indicated in Figure 5. Still more auxiliary water might be added through the diffusion chambers 22 under the entrance bay 3. In this way a large volume of water is provided to attract the fish into the system and whatever velocity has been shown by experience to be most attractive to the fish can be maintained throughout the system.

The water baffling system in the diffusion chambers should efficiently distribute the flow over the full area of the grill 20 and/or 27 and the area of the grills should be sufficient to permit introduction of the required quantity of water at a velocity materially lower than that of the longitudinal flow in the channel. If this condition is met the fish in progressing against the most noticeable velocity will be led directly to the effective entrance to the ladder.

The grills 20 and 27 over the diffusion chambers 14 and 22, in addition to aiding in the diffusion of the auxiliary water, also serve to assure that any fish that might possibly be attracted by the auxiliary water flow will not be able to enter the diffusion chambers. The openings in these grills therefore are made small enough to exclude all mature fish.

If the fish locks 2 and 2a also are in operation, one of them will be open at all times for the entrance of fish and will while so open be discharging water into the entrance bay to attract the fish into the lock chamber. In this case upstream passage to the migrating fish is possible either through the fish locks or over the fish ladder.

If the ladder is out of service and only the fish locks are in operation, no water is permitted to flow from the ladder or the diffusion chambers 14. In this case the diffusion chambers 22 under the entrance bay will be delivering nearly full capacity flow into the entrance bay 3, augmenting the flow from the fish locks and maintaining the desired velocity and attraction.

When the river flow has dropped enough to permit the substantial closing of the spillway gate 6, the unit of the removable collecting channel 4 spanning bay 5 is added. Stop logs 41 are removed from the aperture 39 and placed in corresponding position in the aperture 39a in the pier 28a so as to close the end of the collection channel 4. The stop logs 44, regulating gate 45, and traps 47 also are placed in the fixed entrance 43. The spillway gate 6 is slightly opened so as to provide auxiliary water to the collection channel 4 through the spillway bay 5. The flow over the submerged portion of the ladder and in the entrance bay continues as before except for slight changes in auxiliary water in accordance with the slightly lower tailrace level. The regulating gate 45 in the fixed entrance 43 is adjusted to function as a hydraulic control in diverting a part of the water from the entrance bay 3 into the collection channel 4 through the aperture 39.

As the river flow further declines permitting more spillway gates as 6a to be closed, more units of the collection channel are correspondingly added. The auxiliary water added throughout the system is adjusted in accordance with the changing conditions. As the tailrace level recedes, leaving a shallower depth of water in the collecting system, less auxiliary water is required to maintain an optimum rate of flow through the system.

As more pools of the ladder are exposed above the tailrace level the diffusion chambers under such pools are closed. The quantity of water added through each unit of the removable collecting channel preferably is approximately equal to that discharged to the tailrace over the regulating gates 38 of the same unit. By so doing the quantity of water flowing along the collection channel remains substantially constant. In order to discharge the large quantity of water flowing along the collection channel, one or more entrances at the remote end of the channel should be left completely open, as at 42. These entrances ordinarily would not require traps.

Fish entering the collecting system through any of the fishway entrances find in the collection channel 4 and the entrance bay 3 a conspicuous longitudinal flow of water against which they instinctively will swim and then will thereby be led to the entrance to the fishway proper. Although the water diffusing through the grilled upstream wall 29 of the collection channel 4 should enter the channel at a velocity too low to be attractive to the fish, assurance that none of the fish will attempt to ascend the bay is accomplished by making the openings in the grills too small for the passage of fish. As the fish pass along the course of the collecting system the chance that they might return to the tailrace by way of one of the several entrances is eliminated by the traps 46 and/or 47. The more widely opened entrances as 42 at the remote end of the collection passage usually will need no traps.

It is preferred that the spillway gates used to discharge the river flow be limited at all times to the minimum permissible number. By this procedure the counter attraction presented by the spillway is reduced to a minimum, in that it reduces the area of the spillway at which fish vainly attempt to pass and at the same time produces in this area a velocity too great to be attractive to the fish. Under ideal conditions the velocity in this area would be made so great that fish would be unable to penetrate it and they would be forced to skirt the edges of this flow and thus be led to the entrances of the collecting system. The collection channel should be extended to include the area immediately adjacent to the operating spillway gates; otherwise the full advantages of such a restricted spillway could not be realized.

The general shape and position of the collecting system must be adapted to the conditions at the specific installation. For example, in this instance the removable collection channel is provided as an adaptation to conditions of extreme fluctuation in river flow. It further has been assumed in this instance that as the river flow decreases and the number of spillway gates in use is reduced, the flow conditions below the spillway are such that the fish are able to progress further upstream toward the dam. The removable collection channel, therefore is not constructed parallel to the axis of the dam but is placed obliquely therewith and with its remote end closest to the dam. By so placing the collection channel, the entrances always are protected from the excessive agitation at the base of the spillway and yet the entrances at all river stages are as far up stream as the fish are able to progress.

It further has been assumed in the example illustrated that there always is water to be wasted through the spillway of the dam, in which event there always would be ample water available for the auxiliary supply to the collection system. In case the entire river flow should be needed for useful purposes such as for generating power, as much water as would be needed for auxiliary water in the collecting system might be more economically supplied by pumping, as from the tailrace into the conduit 13.

While the structure shown and described is the preferred embodiment of the invention, it is to be understood that the general structure, arrangement and combination of parts may be altered by those skilled in the art without departing from the spirit of the invention as defined by the following claims.

Having described our invention, what we claim as new and wish to secure by Letters Patent is:

1. In a structure of the class described the combination, with a dam provided with a spillway and with a forebay and a tailrace subjected to variable elevation, of a fish ladder provided with a plurality of stepped pools and disposed between the forebay and the tailrace, a portal terminating the tailrace end of the fish ladder and located in proximity to the spillway discharge from the dam, walls flanking said portal and extending upwardly to approximately the maximum tailrace elevation, diffusion chambers disposed below and in communication with certain ones of said pools near the tailrace end of the fish ladder, a conduit disposed substantially adjacent the fish ladder and in open communication with the forebay, and valve controlled apertures effecting communication between the conduit and said diffusion chambers.

2. In a structure of the class described the combination, with a dam provided with a spillway and with a forebay and a tailrace subjected to variable elevation, of a fish ladder provided with a plurality of stepped pools and disposed between the forebay and the tailrace and carrying a substantially constant hydraulic flow, a portal terminating the tailrace end of the fish ladder and located in proximity to the spillway discharge from the dam, walls flanking said portal and extending upwardly to approximately the maximum tailrace elevation, diffusion chambers disposed below and in communication with certain ones of said pools near the tailrace end of the fish ladder, and means for selective introduction of auxiliary water to said diffusion chambers.

3. The method of maintaining the effectiveness of a fishway over a range of tail-water elevation consisting in arranging the downstream portal of a fishway in proximity to a zone of water discharging into a tailrace and then augmenting the normal flow through the fishway with auxiliary water introduced by diffusion at certain points adjacent the downstream portal for the purpose of producing a hydraulic flow from the fishway portal at a rate, sufficient over a wide range of tail-water elevation to lure the upstream migrants from the attraction of water discharging into the tailrace, and into the portal of the fishway.

4. The method of maintaining the effectiveness of a fishway over a range of tail-water elevation consisting in arranging the downstream entrance of a fishway in predetermined relation with respect to a shiftable zone of water discharging into a tailrace, producing a hydraulic flow from the downstream entrance at a rate, sufficient over a wide range of tail-water elevation to lure the upstream migrants from the attraction of the water discharging into the tailrace and into the entrance of the fishway, shifting the water discharging into the tailrace to different points of discharge in accordance with forebay water conditions and expanding and contracting the entrance of the fishway to retain its predetermined relation with respect to said water discharging into the tailrace.

5. A structure of the class described comprising in combination a forebay, a dam construction provided with a spillway, a tailrace having a variable elevation, a fishway disposed between the forebay and the tailrace and carrying a substantially constant hydraulic flow, a portal terminating the tailrace end of the fishway and located in proximity to the spillway discharge, walls flanking said portal and extending upwardly to approximately the maximum tailrace elevation and means disposed near the lower end of the hydraulic gradient for augmenting the hydraulic flow through said portal, whereby to produce over a wide range of tail-water elevation, a rate of flow from the fishway portal sufficient to lure the upsteam migrants from the hydraulic attraction afforded by the spillway discharge.

6. A structure of the class described comprising in combination a forebay, a dam construction provided with a spillway, a tailrace having a variable elevation, a fishway disposed between the forebay and the tailrace and carrying a substantially constant hydraulic flow, a portal terminating the tailrace end of the fishway and located in proximity to the spillway discharge, walls flanking said portal and extending upwardly to approximately the maximum tailrace elevation, and means disposed near the lower end of the hydraulic gradient for augmenting the hydraulic flow at selectively determined points adjacent the portal, whereby to produce, over a wide range of tail-water elevation, a rate of flow from the fishway portal sufficient to lure the upstream migrants from the hydraulic attraction afforded by the spillway discharge.

7. A structure of the class described comprising in combination a forebay, a dam construction provided with a spillway, a tailrace having a variable elevation, a fishway disposed between the forebay and the tailrace and carrying a substantially constant hydraulic flow, a portal terminating the tailrace end of the fishway and located in proximity to the spillway discharge, walls flanking said portal and extending upwardly at approximately the maximum tailrace elevation, a plurality of diffusion chambers disposed near the lower end of the fishway, a water supply for said chambers and means for selectively rendering said diffusion chambers effective for augmenting the hydraulic flow through said portal, whereby to produce, over a wide range of tail-water elevation, a rate of flow from the fishway portal sufficient to lure the upstream migrants from the hydraulic attraction afforded by the spillway discharge.

8. A structure of the class described comprising in combination a forebay, a dam construction provided with a spillway, gate means for controlling the spillway discharge, a tailrace having a variable elevation, a fishway disposed between the forebay and the tailrace and carrying a substantially constant flow, a fish entrance terminating the tailrace end of the fishway and located in predetermined relation with respect to the spillway discharge, means disposed adjacent the fishway entrance for augmenting the hydraulic flow therefrom, and additional means in connection with the fishway entrance and the spillway to enable expansion and contraction of entrance in accordance with the spillway discharge, whereby to maintain the predetermined relation between said entrance and said spillway discharge.

9. A structure of the class described comprising in combination a forebay, a dam construction provided with a spillway, gate means for controlling the spillway flow, a tailrace having a variable elevation, an entrance bay adjoining the downstream end of the spillway, fish entrance means for the bay, said means being in controlled communication with the tailrace, a fishway disposed between the forebay and the entrance bay and carrying a substantially constant hydraulic flow, means for augmenting said hydraulic flow, a collection channel extending transversely of the downstream end of the spillway, said channel being in controlled communication with the tailrace, and means for placing sections of said collection channel in communication with the entrance bay, whereby to effect an expansion and contraction of the fish entrance means in accordance with the spillway flow.

10. A structure of the class described comprising in combination a forebay, a dam construction provided with a spillway, gate means for controlling the spillway flow, a tailrace having a variable elevation, an entrance bay adjoining the downstream end of the spillway, fish entrance means for the bay, said means being in controlled communication with the tailrace, a fishway disposed between the forebay and the entrance bay and carrying a substantially constant hydraulic flow, means for augmenting said hydraulic flow, an obliquely extending collection channel at the downstream end of the spillway, said channel being in controlled communication with the tailrace, and means for placing sections of said collection channel in communication with the entrance bay, whereby to effect an expansion and contraction of the fish entrance means in accordance with the spillway flow.

11. A structure of the class described comprising in combination a forebay, a dam construction provided with a spillway, gate means for controlling the spillway flow, a tailrace having a variable elevation, an entrance bay adjoining the downstream end of the spillway, fish entrance means for the bay, said means being in controlled communication with the tailrace, a fishway disposed between the forebay and the entrance and carrying a substantially constant hydraulic flow, means for augmenting the flow from the fish entrance means into the tailrace, a plurality of spaced parallel piers partitioning the spillway flow, each of said piers having their inner aperture near its downstream end, fish deterrents disposed between adjoining piers adjacent the upstream edges of said apertures, weirs disposed between adjoining piers adjacent the downstream edges of said apertures, said fish deterrent and weirs coacting to form a collection channel extending transversely of the downstream end of the spillway and in controlled communication with the tailrace, and means for placing sections with the entrance bay, whereby to effect an expansion and contraction of the entrance means of said bay in accordance with spillway flow.

HARLAN B. HOLMES.
HENRY F. BLOOD.
MILO C. BELL.